US008574741B2

(12) United States Patent
Sato

(10) Patent No.: US 8,574,741 B2
(45) Date of Patent: Nov. 5, 2013

(54) METHOD FOR CONTROLLING SODIUM-SULFUR BATTERY

(75) Inventor: Mitsuharu Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/039,687

(22) Filed: Mar. 3, 2011

(65) Prior Publication Data

US 2011/0206953 A1    Aug. 25, 2011

Related U.S. Application Data

(63) Continuation of application No. PCT/JP2009/066614, filed on Sep. 25, 2009.

(60) Provisional application No. 61/101,170, filed on Sep. 30, 2008.

(51) Int. Cl.
*H01M 2/26* (2006.01)
*H02J 7/00* (2006.01)

(52) U.S. Cl.
USPC ............... 429/121; 429/91; 429/92; 429/93; 429/122; 429/123; 320/103

(58) Field of Classification Search
USPC ................ 429/90–93, 121–123; 320/103
See application file for complete search history.

(56) References Cited

U.S. PATENT DOCUMENTS

| | | | | |
|---|---|---|---|---|
| 5,631,534 A | * | 5/1997 | Lewis ............................ | 320/103 |
| 5,872,444 A | * | 2/1999 | Nagano et al. ................ | 320/106 |
| 2003/0186111 A1 | * | 10/2003 | Tamakoshi ..................... | 429/62 |
| 2004/0121223 A1 | * | 6/2004 | Kim ................................ | 429/61 |
| 2005/0024015 A1 | * | 2/2005 | Houldsworth et al. ....... | 320/119 |
| 2008/0076010 A1 | | 3/2008 | Sato | |
| 2010/0057385 A1 | | 3/2010 | Iida | |

FOREIGN PATENT DOCUMENTS

| | | |
|---|---|---|
| CN | 2582184 Y | 10/2003 |
| CN | 1705158 A | 12/2005 |
| JP | 2003-317808 A1 | 11/2003 |
| JP | 2004-023879 A1 | 1/2004 |
| JP | 2006-339077 A1 | 12/2006 |
| JP | 2008-084677 A1 | 4/2008 |
| JP | 2008-134060 A1 | 6/2008 |

OTHER PUBLICATIONS

Chinese Office Action dated Dec. 12, 2012 (with English translation).
Chinese Office Action dated Jul. 5, 2013.

* cited by examiner

*Primary Examiner* — Patrick Ryan
*Assistant Examiner* — Alex Usyatinsky
(74) *Attorney, Agent, or Firm* — Burr & Brown

(57) ABSTRACT

A method for controlling a plurality of sodium-sulfur batteries that, in an interconnected system in which a power generation device that fluctuates in output and an electric power storage-compensation device are combined to supply power to an electric power system, are each included in the electric power storage-compensation device and compensate for output fluctuations of the power generation device, is provided. When one sodium-sulfur battery of the plurality of sodium-sulfur batteries reaches a discharge end, the sodium-sulfur battery reaching the discharge end is charged from a sodium-sulfur battery other than the sodium-sulfur battery reaching the discharge end. When one sodium-sulfur battery of the plurality of sodium-sulfur batteries reaches a charge end, the sodium-sulfur battery reaching the charge end is discharged to charge a sodium-sulfur battery other than the sodium-sulfur battery reaching the charge end.

13 Claims, 4 Drawing Sheets

METHOD FOR CONTROLLING SODIUM-SULFUR BATTERY

TECHNICAL FIELD

The present invention relates to a method for controlling sodium-sulfur batteries. More specifically, the present invention relates to a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

BACKGROUND ART

In recent years, a natural energy power generation device for generating power from wind, solar power, geothermal heat, or the like has attracted attention and been put to practical use. The natural energy power generation device is a clean power generation device that does not use any limited resource such as oil but uses an energy resource present in unlimited quantity in nature, and can suppress carbon dioxide emissions. Hence, the natural energy power generation device has been increasingly introduced by companies, governments, and the like, for prevention of global warming.

However, since energy coming from nature varies from moment to moment, output fluctuations are unavoidable in the natural energy power generation device. This poses an obstacle to widespread use of the natural energy power generation device. To remove this obstacle, in the case of employing the natural energy power generation device, it is preferable to build an interconnected (power generation) system that combines the natural energy power generation device with an electric power storage-compensation device having a plurality of sodium-sulfur batteries (secondary batteries) as a main component.

A sodium-sulfur battery has features such as a high energy density, an ability to produce high output in a short time, and an excellent high-speed response. Accordingly, when a bidirectional converter for controlling charge and discharge is added, the sodium-sulfur battery offers an advantage that output fluctuations of the natural energy power generation device which can occur on the order of several hundred milliseconds to several seconds can be compensated. Therefore, the interconnected system in which the natural energy power generation device is combined with the electric power storage-compensation device having the plurality of sodium-sulfur batteries as the component is a desirable power generation system.

However, since power generated by the natural energy power generation device instantaneously fluctuates in accordance with its energy source, input or output of power is frequently repeated in the electric power storage-compensation device. This means the sodium-sulfur battery forming the electric power storage-compensation device continuously repeats charge or discharge. As a result, a battery discharge capacity of the sodium-sulfur battery cannot be managed accurately, leading to a problem that the sodium-sulfur battery suddenly reaches a charge end and becomes unable to continue charge or suddenly reaches a discharge end and becomes unable to continue discharge, and stops in the middle of compensating for output fluctuations of the natural energy power generation device.

In view of this, it has been proposed to solve the above-mentioned problem, by detecting a charge end neighborhood or a discharge end neighborhood and changing an output power control target value of a bidirectional converter so that the battery discharge capacity approaches a median value of a rated battery capacity (e.g., see Patent Document 1).

PRIOR ART DOCUMENT

Patent Document

Patent Document 1: JP-A-2003-317808

SUMMARY OF THE INVENTION

The present invention has been made in view of such a problem of the conventional techniques, and has an object of providing a sodium-sulfur battery control method that enables fluctuations of natural energy to be compensated over a wide range.

As a result of conducting intensive study to achieve the stated object, the present inventors have found that the above-mentioned problem can be solved by controlling the sodium-sulfur battery so as to be in an intermediate state that is neither the charge end nor the discharge end, and completed the present invention.

That is, the following sodium-sulfur battery control method is provided according to the present invention.

[1] A method for controlling a plurality of sodium-sulfur batteries that, in an interconnected system in which a power generation device that fluctuates in output and an electric power storage-compensation device are combined to supply power to an electric power system, are each included in the electric power storage-compensation device and compensate for output fluctuations of the power generation device, the method comprising compensating for the output fluctuations of the power generation device, while controlling so that all of the plurality of sodium-sulfur batteries are in a state of not reaching any of a charge end and a discharge end by: charging, when one sodium-sulfur battery of the plurality of sodium-sulfur batteries reaches the discharge end, the sodium-sulfur battery reaching the discharge end, from a sodium-sulfur battery other than the sodium-sulfur battery reaching the discharge end; and discharging, when one sodium-sulfur battery of the plurality of sodium-sulfur batteries reaches the charge end, the sodium-sulfur battery reaching the charge end, to charge a sodium-sulfur battery other than the sodium-sulfur battery reaching the charge end.

[2] The method for controlling a plurality of sodium-sulfur batteries according to [1], wherein when one sodium-sulfur battery of the plurality of sodium-sulfur batteries reaches the discharge end, all other sodium-sulfur batteries are uniformly discharged to charge the sodium-sulfur battery reaching the discharge end, and when one sodium-sulfur battery of the plurality of sodium-sulfur batteries reaches the charge end, the sodium-sulfur battery reaching the charge end is discharged to uniformly charge all other sodium-sulfur batteries.

[3] The method for controlling a plurality of sodium-sulfur batteries according to [1], wherein when one sodium-sulfur battery of the plurality of sodium-sulfur batteries reaches the discharge end, a sodium-sulfur battery closest to the charge end among other sodium-sulfur batteries is discharged to charge the sodium-sulfur battery reaching the discharge end, and when one sodium-sulfur battery of the plurality of sodium-sulfur batteries reaches the charge end, the sodium-sulfur battery reaching the charge end is discharged to charge a sodium-sulfur battery closest to the discharge end among other sodium-sulfur batteries.

[4] The method for controlling a plurality of sodium-sulfur batteries according to any one of [1] to [3], wherein the output fluctuations of the power generation device are compensated while controlling so that the plurality of sodium-sulfur batteries each have a remaining capacity ratio of 20% to 80%.

[5] The method for controlling a plurality of sodium-sulfur batteries according to any one of [1] to [4], wherein the power generation device that fluctuates in output is a natural energy power generation device that uses natural energy of at least one of wind, solar power, and geothermal heat.

The sodium-sulfur battery control method according to the present invention compensates for output fluctuations of the power generation device while controlling so that all of the plurality of sodium-sulfur batteries are in a state of not reaching any of the charge end and the discharge end by: charging, when one sodium-sulfur battery of the plurality of sodium-sulfur batteries reaches the discharge end, the sodium-sulfur battery reaching the discharge end, from a sodium-sulfur battery other than the sodium-sulfur battery reaching the discharge end; and discharging, when one sodium-sulfur battery of the plurality of sodium-sulfur batteries reaches the charge end, the sodium-sulfur battery reaching the charge end, to charge a sodium-sulfur battery other than the sodium-sulfur battery reaching the charge end. Accordingly, even when one sodium-sulfur battery reaches the discharge end or the charge end, the sodium-sulfur battery is not left in the state of the discharge end or the charge end but immediately returned to the intermediate state (the state of neither the charge end nor the discharge end). This enables fluctuations of natural energy to be compensated over a wide range.

BEST MODE FOR CARRYING OUT THE INVENTION

The following describes a best mode for carrying out the present invention. However, it is to be understood that the present invention is not limited to the following embodiment, and design changes, improvements, and the like can be appropriately added on the basis of common knowledge of a person skilled in the art without departing from the scope of the present invention.

Figure 1:
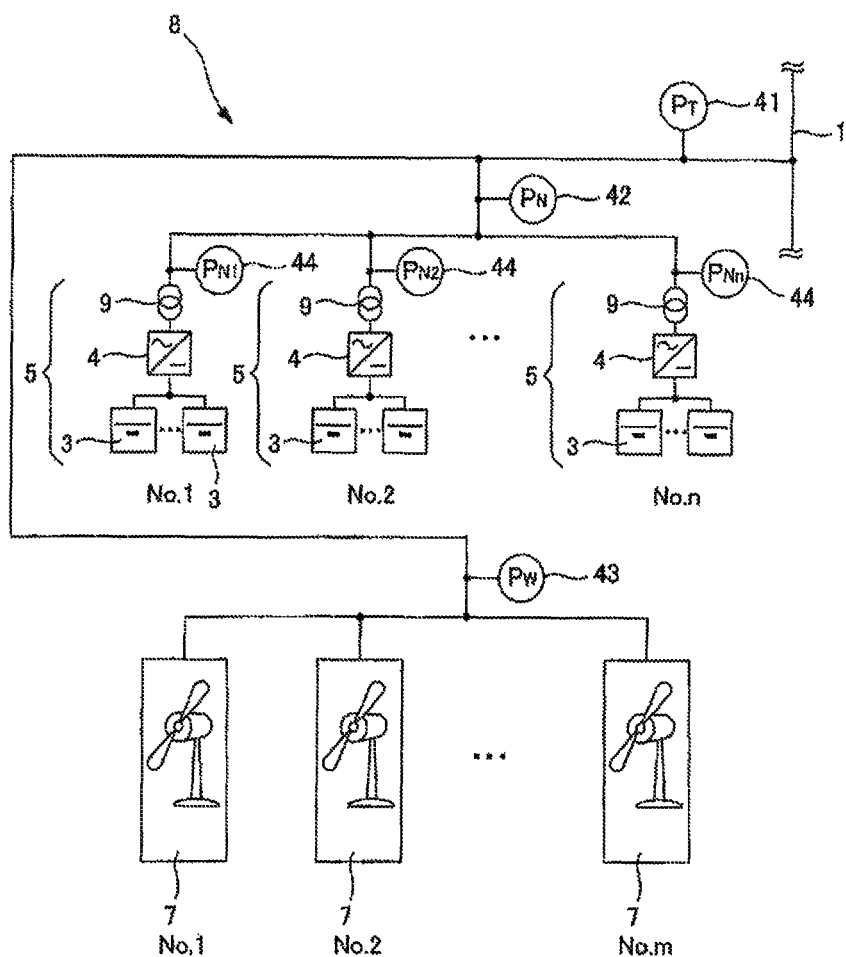
FIG. 1 is a system configuration diagram showing an example of an interconnected system including a power generation device that fluctuates in output and an electric power storage-compensation device.

An interconnected system is described first. A system configuration diagram shown in FIG. 1 represents an example of an interconnected system including a power generation device that fluctuates in output and an electric power storage-compensation device. An interconnected system 8 shown in FIG. 1 includes a wind power generation device 7 (natural energy power generation device) that turns a power generator by converting wind power into windmill rotation, and an electric power storage-compensation device 5. The electric power storage-compensation device 5 includes a sodium-sulfur battery 3 which is a secondary battery capable of storing and outputting power, a bidirectional converter 4 having a dc/ac conversion function, and a transformer 9. For example, the bidirectional converter 4 may be composed of a chopper and an inverter, or composed of an inverter. The interconnected system 8 has m systems of the wind power generation device 7, i.e., No. 1 to No. m (m is an integer larger than 1) and n systems of the sodium-sulfur battery 3 (the electric power storage-compensation device 5), i.e., No. 1 to No. n (n is an integer larger than 1).

Note that, in this description, a single (one) sodium-sulfur battery of a plurality of sodium-sulfur batteries means a sodium-sulfur battery that is separated from other sodium-sulfur batteries in unit of control, and is not determined by the number of cells, the number of module batteries, an output magnitude, and the like. In detail, in the case where a sodium-sulfur battery composes the electric power storage-compensation device, a sodium-sulfur battery under control of one bidirectional converter is treated as one sodium-sulfur battery. It is desirable that all sodium-sulfur batteries have the same rated capacity, though the rated capacity need not necessarily be the same. Sodium-sulfur batteries 3 included in one electric power storage-compensation device 5 are treated as one sodium-sulfur battery 3 as a whole. Moreover, a typical interconnected system includes a private power generator as a power generation device and a sodium-sulfur battery heater and other auxiliary machines as a load, but they are omitted in the interconnected system 8. In the sodium-sulfur battery control method according to the present invention, they can be regarded as being included (added or subtracted) in power generated by the power generation device (the wind power generation device 7) that fluctuates in output.

In the interconnected system 8, the sodium-sulfur battery 3 is discharged in the electric power storage-compensation device 5, and power $P_N$ measured by a power meter 42 (power $P_{Nn}$ of each sodium-sulfur battery 3 is measured by a power meter 44) compensates for output fluctuations of power (power $P_W$ measured by a power meter 43) generated by the wind power generation device 7. In detail, by controlling the discharge (i.e., power $P_N$) of the sodium-sulfur battery 3 so that power (power $P_T$ measured by a power meter 41) output from the interconnected system 8 as a whole satisfies "$P_T=P_W+P_N$=constant" ($P_N=P_T-P_W$), stable power of high quality is output as power $P_T$ from the whole interconnected system 8, and supplied, for example, to an electric power system 1 between a distributing substation and a consumer of electricity.

Moreover, in the interconnected system 8, the sodium-sulfur battery 3 is charged in the electric power storage-compensation device 5, in accordance with output fluctuations of power $P_W$ generated by the wind power generation device 7. In detail, by controlling the charge (i.e., power $-P_N$) of the sodium-sulfur battery 3 so that power $P_N$ measured by the power meter 42 is "$P_N=-P_W$", fluctuating power $P_W$ is consumed, as a result of which power $P_T$ output from the whole interconnected system 8 can be brought to 0.

In either of the case of charging the sodium-sulfur battery 3 and the case of discharging the sodium-sulfur battery 3, the sodium-sulfur battery 3 is charged or discharged by changing a control target value of the bidirectional converter 4 in the electric power storage-compensation device 5 based on the output (power $P_W$) of the wind power generation device 7 so that power for compensating for the output is input or output, thereby absorbing output fluctuations of the wind power generation device 7. Since stable power of high quality can be supplied by using the natural energy power generation device (the wind power generation device 7) that emits almost no carbon dioxide and the sodium-sulfur battery 3 (the electric power storage-compensation device 5), the interconnected system 8 is a favorable power generation system.

Figure 2A:
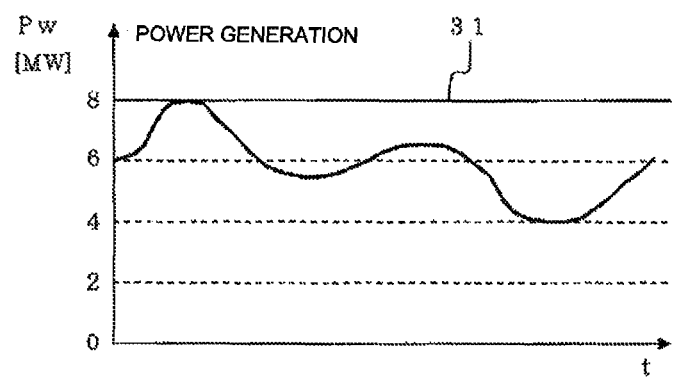
FIG. 2A is a graph showing an example of a time series change of power generated by a wind power generation device.
Figure 2B:
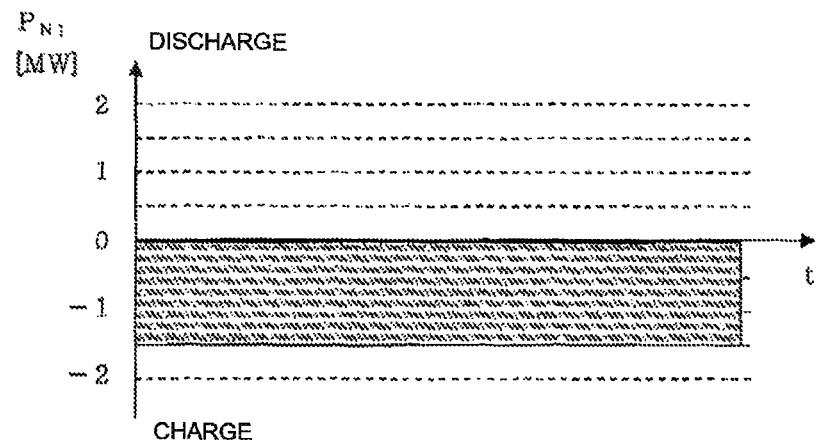
FIG. 2B is a graph showing an example of a time series change of power when a sodium-sulfur battery reaching the discharge end is charged.
Figure 2C:
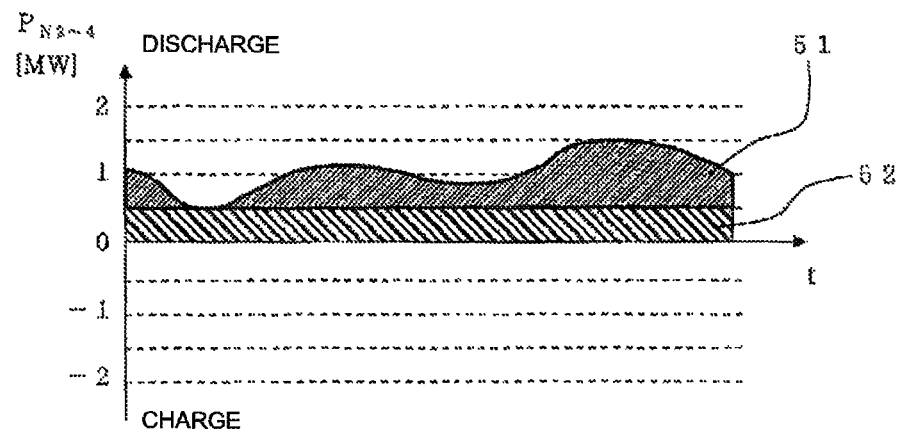
FIG. 2C is a graph showing an example of a time series change of power when sodium-sulfur batteries other than the sodium-sulfur battery reaching the discharge end are discharged.

The following describes control of the sodium-sulfur batteries 3 (one embodiment of the sodium-sulfur battery control method according to the present invention) in the interconnected system 8 shown in FIG. 1, in the case where the sodium-sulfur batteries 3 are charged and discharged while maintaining power $P_T$ traded with the electric power system at 8 MW (electric power sales target 31), with reference to FIGS. 2A to 2C. Note that FIGS. 2A to 2C show a time series change of power (output) in the case where the number of systems of sodium-sulfur battery 3 (electric power storage-compensation device 5) in the interconnected system 8 is four (n=4). In FIGS. 2A to 2C, a horizontal axis is a time axis, and represents time t. There are four sodium-sulfur batteries 3 (electric power storage-compensation devices 5) of No. 1 to No. 4, where rated input power of one sodium-sulfur battery 3 is 2 MW.

FIG. 2A is a graph showing an example of output of the wind power generation device 7. In FIG. 2A, a vertical axis represents power $P_W$ measured by the power meter 43.

FIG. 2B is a graph showing a state in which a sodium-sulfur battery 3 reaching the discharge end is charged with power discharged from the other sodium-sulfur batteries 3, in the same period of time as in FIG. 2A. In FIG. 2B, a vertical axis represents power $P_{N1}$ measured by the power meter 44.

FIG. 2C is a graph showing an example of output of the sodium-sulfur batteries 3 other than the above-mentioned sodium-sulfur battery 3 reaching the discharge end, in the same period of time as in FIG. 2A. In the sodium-sulfur battery control method of this embodiment, the three sodium-sulfur batteries 3 other than the above-mentioned sodium-sulfur battery 3 reaching the discharge end have the same output, as shown by the graph in FIG. 2C. In FIG. 2C, a vertical axis represents power $P_{N2-4}$ measured by the power meter 44. "Power $P_{N2-4}$" denotes "power $P_{N2}$, power $P_{N3}$, or power $P_{N4}$ (power $P_{N2}$ to $P_{N4}$)".

The graphs shown in FIGS. 2A to 2C represent the following situation. When one sodium-sulfur battery 3 reaches the discharge end, the other three sodium-sulfur batteries 3 all discharge uniformly, thereby charging the sodium-sulfur battery 3 reaching the discharge end. While controlling so that all of the plurality of sodium-sulfur batteries are in a state of not reaching any of the charge end and the discharge end in this manner, output fluctuations of the power generation device are compensated. As shown in FIGS. 2B and 2C, a "discharge to other battery 52" portion of power $P_{N2}$ to $P_{N4}$, which is discharged from the other three sodium-sulfur batteries 3, is charged to the sodium-sulfur battery 3 reaching the discharge end, as power $P_{N1}$. As a result, the sodium-sulfur battery 3 reaching the discharge end is not left long in the state of the discharge end, but immediately returned to the intermediate state (the state of neither the charge end nor the discharge end). This enables fluctuations of natural energy to be compensated over a wide range. In the sodium-sulfur battery control method of this embodiment, all sodium-sulfur batteries 3 other than the sodium-sulfur battery 3 reaching the discharge end are discharged to charge the sodium-sulfur battery 3 reaching the discharge end. However, a part of the sodium-sulfur batteries 3 other than the sodium-sulfur battery 3 reaching the discharge end may be discharged to charge the sodium-sulfur battery 3 reaching the discharge end. Moreover, though the discharge (discharge for charging the sodium-sulfur battery reaching the discharge end) from the sodium-sulfur batteries 3 other than the sodium-sulfur battery 3 reaching the discharge end is preferably uniform, the discharge may not be uniform.

It is preferable to perform control of charging power discharged from the other three sodium-sulfur batteries 3 to the sodium-sulfur battery 3 reaching the discharge end so that the four sodium-sulfur batteries each have a remaining capacity ratio of 20% to 80% (intermediate state). In the sodium-sulfur battery control method according to the present invention, it is preferable to perform control so that the sodium-sulfur batteries are kept in the above-mentioned intermediate state.

Moreover, a time for charging power discharged from the other three sodium-sulfur batteries 3 to the sodium-sulfur battery 3 reaching the discharge end is preferably as short as possible. It is preferable that the charge is performed within 1 to 1800 seconds after detecting the discharge end of the sodium-sulfur battery 3. It is difficult to shorten the time below 1 second in actual operation. Meanwhile, a time longer than 1800 seconds can cause a problem such as a failure to perform power compensation operation.

In the sodium-sulfur battery control method of this embodiment, it is preferable that, when one sodium-sulfur battery 3 reaches the charge end, the sodium-sulfur battery 3 reaching the charge end is discharged to uniformly charge all of the other three sodium-sulfur batteries. The sodium-sulfur battery 3 reaching the charge end may be discharged to charge all sodium-sulfur batteries 3 other than the sodium-sulfur battery 3 reaching the charge end. Alternatively, the sodium-sulfur battery 3 reaching the charge end may be discharged to charge a part of the sodium-sulfur batteries 3 other than the sodium-sulfur battery 3 reaching the charge end. Though the charge (charge of power discharged from the sodium-sulfur battery reaching the charge end) to the sodium-sulfur batteries 3 other than the sodium-sulfur battery 3 reaching the charge end is preferably uniform, the charge may not be uniform.

Figure 4:
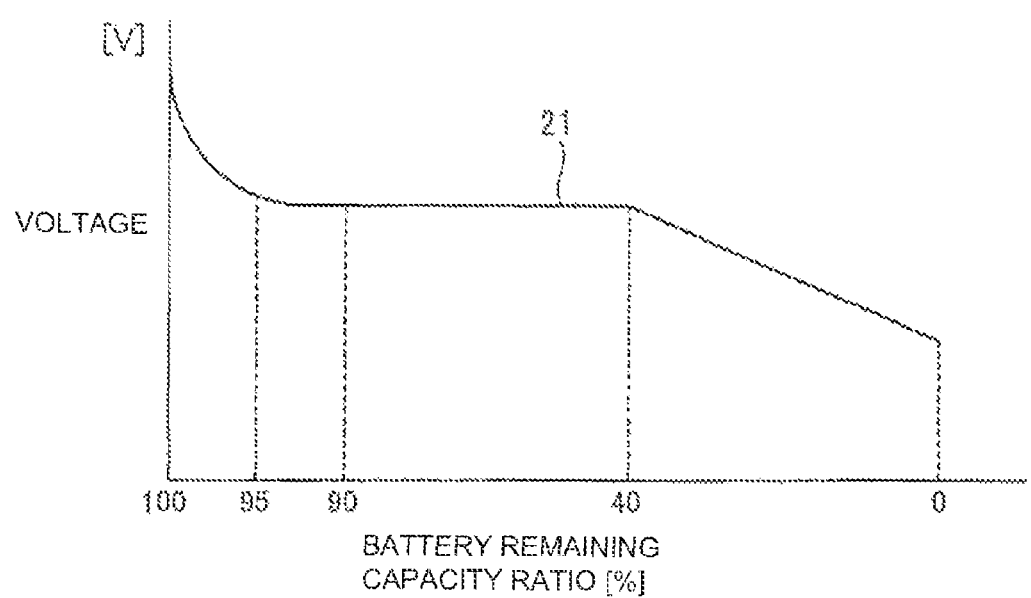
FIG. 4 is a graph showing a correlation between a battery remaining capacity ratio (%) and a battery voltage (V) in a sodium-sulfur battery.

In the sodium-sulfur battery control method of this embodiment, it is necessary to detect that one sodium-sulfur battery 3 reaches the discharge end or the charge end. FIG. 4 is a graph showing a correlation between a battery remaining capacity ratio (%) (also simply written as a remaining capacity ratio) in the sodium-sulfur battery 3 and a battery voltage (V). The remaining capacity ratio indicates a ratio (%) of a dischargeable capacity (Ah) to a rated capacity (Ah) of the sodium-sulfur battery, and so a discharge capacity (Ah) which is an already discharged capacity is calculated by "rated capacity (Ah)×(100−remaining capacity ratio (%))". As is clear from a correlation curve 21 in FIG. 4, the sodium-sulfur battery has the following (typical) property. When the remaining capacity ratio is about 40 to 90%, the battery voltage (also simply written as a voltage) is kept constant regardless of the remaining capacity ratio. When charge progresses and the remaining capacity ratio becomes about 95% (that is, when the discharge capacity becomes about 5% of the rated capacity), the voltage increases. Accordingly, by setting, in the range where the voltage increases, a voltage corresponding to a remaining capacity ratio to be identified as the charge end, it is possible to determine the charge end when the charge progresses and the set voltage is reached. Moreover, as shown in FIG. 4, the voltage changes (decreases) in the discharge end, too. Accordingly, by equally setting a voltage corresponding to a remaining capacity ratio to be identified as the discharge end, it is possible to detect the discharge end.

In the sodium-sulfur battery control method according to the present invention, it is preferable that the power generation device that fluctuates in output is a natural energy power generation device that uses natural energy of at least one of wind, solar power, and geothermal heat.

The following describes control of the sodium-sulfur batteries 3 (another embodiment of the sodium-sulfur battery control method according to the present invention) in the interconnected system 8 shown in FIG. 1, in the case where the sodium-sulfur batteries 3 are charged and discharged while maintaining power $P_T$ traded with the electric power system at 8 MW (electric power sales target 31), with reference to FIGS. 3A to 3D. Note that FIGS. 3A to 3D show a time series change of power (output) in the case where the number of systems of sodium-sulfur battery 3 (electric power storage-compensation device 5) in the interconnected system 8 is four (n=4). In FIGS. 3A to 3D, a horizontal axis is a time axis, and represents time t. There are four sodium-sulfur batteries 3 (electric power storage-compensation devices 5) of No. 1 to No. 4, where rated input power of one sodium-sulfur battery 3 is 2 MW.

Figure 3A:
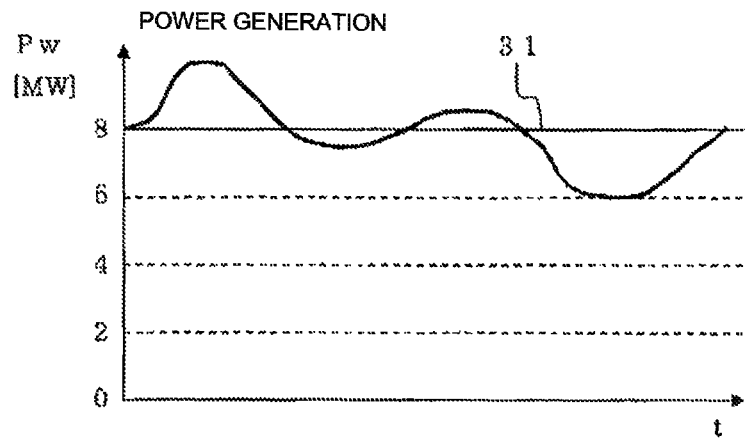
FIG. 3A is a graph showing an example of a time series change of power generated by the wind power generation device.

FIG. 3A is a graph showing an example of output of the wind power generation device 7. In FIG. 3A, a vertical axis represents power $P_W$ measured by the power meter 43.

Figure 3B:
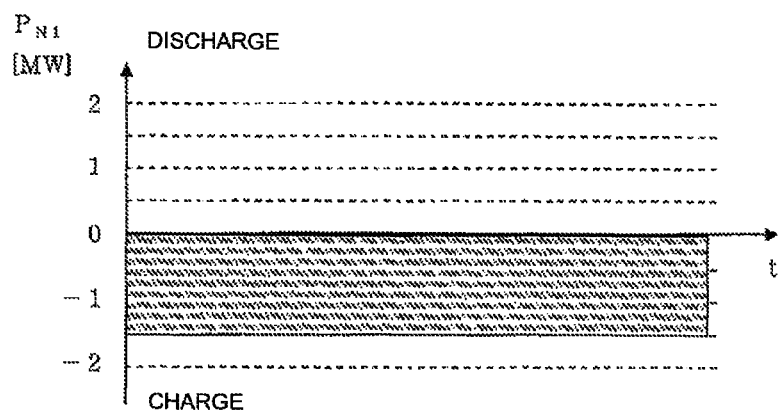
FIG. 3B is a graph showing an example of a time series change of power when a sodium-sulfur battery reaching the discharge end is charged.

FIG. 3B is a graph showing a state in which a sodium-sulfur battery 3 reaching the discharge end is charged with power discharged from another sodium-sulfur battery 3 (one sodium-sulfur battery 3 closest to the charge end), in the same period of time as in FIG. 3A. In FIG. 3B, a vertical axis represents power $P_{N1}$ measured by the power meter 44.

Figure 3C:
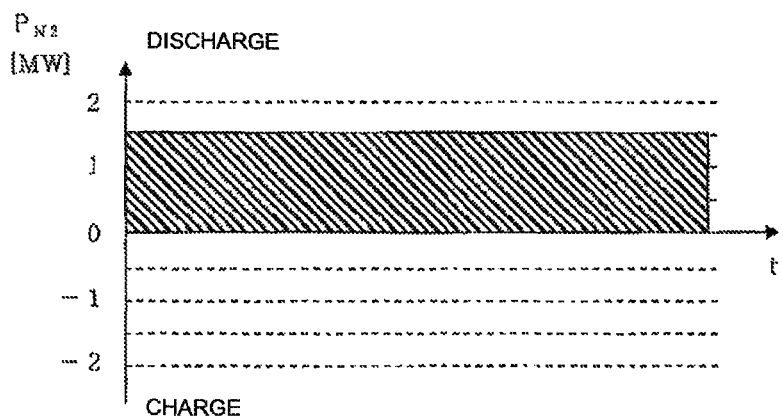
FIG. 3C is a graph showing an example of a time series change of power when a sodium-sulfur battery closest to the charge end is discharged.

FIG. 3C is a graph showing an example of output of the sodium-sulfur battery 3 closest to the charge end among the sodium-sulfur batteries 3 other than the sodium-sulfur battery 3 reaching the discharge end, in the same period of time as in FIG. 3A. In FIG. 3C, a vertical axis represents power $P_{N2}$ measured by the power meter 44.

Figure 3D:
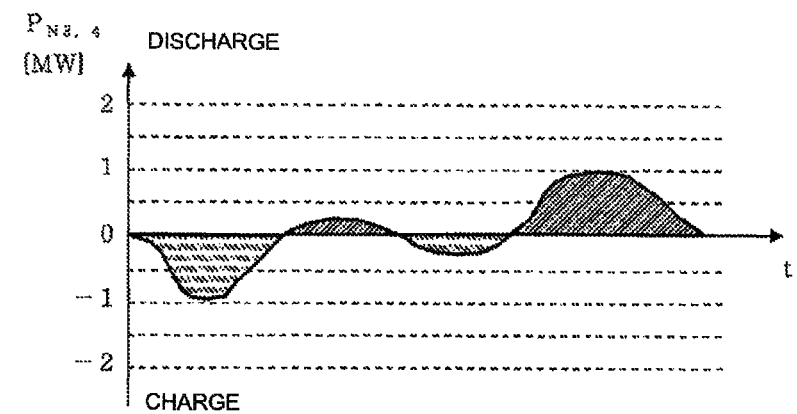
FIG. 3D is a graph showing an example of a time series change of power when a sodium-sulfur battery is charged and discharged.

FIG. 3D is a graph showing an example of output of the two sodium-sulfur batteries 3 except the sodium-sulfur battery 3 closest to the charge end among the three sodium-sulfur batteries 3 other than the above-mentioned sodium-sulfur battery 3 reaching the discharge end, in the same period of time as in FIG. 3A. In the sodium-sulfur battery control method of this embodiment, the two sodium-sulfur batteries 3 except the sodium-sulfur battery 3 closest to the charge end among the three sodium-sulfur batteries 3 other than the above-mentioned sodium-sulfur battery 3 reaching the discharge end have the same output, as shown by the graph in FIG. 3D. In FIG. 3D, a vertical axis represents power $P_{N3,4}$ measured by the power meter 44. "Power $P_{N3,4}$" denotes "power $P_{N3}$ or power $P_{N4}$".

The graphs shown in FIGS. 3A to 3D represent the following situation. When one sodium-sulfur battery 3 reaches the discharge end, a sodium-sulfur battery 3 closest to the charge end among the other three sodium-sulfur batteries 3 discharges, thereby charging the sodium-sulfur battery 3 reaching the discharge end. While controlling so that all of the plurality of sodium-sulfur batteries are in a state of not reaching any of the charge end and the discharge end in this manner, output fluctuations of the power generation device are compensated. As shown in FIGS. 3B and 3C, power discharged from one sodium-sulfur battery 3 closest to the charge end is charged to the sodium-sulfur battery 3 reaching the discharge end. As a result, the sodium-sulfur battery 3 reaching the discharge end is not left long in the state of the discharge end, but immediately returned to the intermediate state (the state of neither the charge end nor the discharge end). This enables fluctuations of natural energy to be compensated over a wide range. Furthermore, as shown in FIG. 3D, the output of the wind power generation device 7 is compensated by charge and discharge of the two sodium-sulfur batteries 3 except the sodium-sulfur battery 3 reaching the discharge end and the sodium-sulfur battery 3 closest to the charge end, among the four sodium-sulfur batteries 3. In the sodium-sulfur battery control method of this embodiment, the charge/discharge of the two sodium-sulfur batteries 3 that compensate for the output of the wind power generation device 7 is uniform. However, the charge/discharge may not be uniform.

In the sodium-sulfur battery control method of this embodiment, it is preferable that, when one sodium-sulfur battery 3 reaches the charge end, the sodium-sulfur battery 3 reaching the charge end is discharged to charge its power to one sodium-sulfur battery 3 closest to the discharge end among the other three sodium-sulfur batteries 3, to compensate for output fluctuations of the power generation device while controlling so that all of the plurality of sodium-sulfur batteries are in a state of not reaching any of the charge end and the discharge end in this manner. In such a case, the output of the wind power generation device 7 is compensated by the remaining two sodium-sulfur batteries 3. Though the charge/discharge of the two sodium-sulfur batteries 3 compensating for the output of the wind power generation device 7 is preferably uniform, the charge/discharge may not be uniform.

In the sodium-sulfur battery control method of this embodiment, the points other than those described above are preferably the same as the preceding embodiment of the sodium-sulfur battery control method according to the present invention.

INDUSTRIAL APPLICABILITY

The sodium-sulfur battery control method according to the present invention can be utilized as a method for controlling, in an interconnected system in which a power generation device that uses natural energy such as wind, solar power, geothermal heat, or the like and fluctuates in output and an electric power storage-compensation device are combined to supply power to an electric power system, a plurality of sodium-sulfur batteries included in the electric power storage-compensation device.

Description of Reference Numerals

1: electric power system
3: sodium-sulfur battery
4: bidirectional converter
5: electric power storage-compensation device
7: wind power generation device
8: interconnected system
9: transformer
21: correlation curve
31: electric power sales target
41, 42, 43, 44: power meter
51: discharge to system
52: discharge to other battery

The invention claimed is:

1. A method for controlling a plurality of sodium-sulfur batteries that, in an interconnected system in which a power generation device that fluctuates in output and an electric power storage-compensation device comprising a plurality of sodium-sulfur batteries connected in parallel are combined to supply power to an electric power system, are each included in the electric power storage-compensation device and compensate for output fluctuations of the power generation device, the method comprising compensating for the output fluctuations of the power generation device, while controlling so that all of the plurality of sodium-sulfur batteries are within a predetermined charged range by:

detecting when one or more of the plurality of sodium-sulfur batteries reaches one of a charge end or a discharge end within the predetermined charged range;

when one sodium-sulfur battery of the plurality of sodium-sulfur batteries reaches the discharge end of the predetermined charged range, charging the sodium-sulfur battery reaching the discharge end of the predetermined charged range by uniformly discharging all sodium-sulfur batteries of the plurality of sodium sulfur batteries other than the sodium-sulfur battery reaching the discharge end of the predetermined charged range and simultaneously discharging voltage from all of the sodium-sulfur batteries other than the sodium-sulfur battery reaching the discharge end to maintain the power output for the interconnected system at a predetermined target value; and when one sodium-sulfur battery of the plurality of sodium-sulfur batteries reaches the charge end of the predetermined charged range, discharging the sodium-sulfur battery reaching the charge end of the predetermined charged range, to charge a sodium-sulfur battery other than the sodium-sulfur battery reaching the charge end of the predetermined charged range, wherein values for the discharge end and the charge end are set by setting control target values of a bidirectional converter, wherein the charge end of one of the sodium-sulfur batteries is detected by measuring a voltage increase, and wherein the discharge end of one of the sodium-sulfur batteries is detected by measuring a voltage decrease.

2. The method for controlling a plurality of sodium-sulfur batteries according to claim 1, wherein when one sodium-sulfur battery of the plurality of sodium-sulfur batteries reaches the charge end of the predetermined charged range, the sodium-sulfur battery reaching the charge end of the predetermined charged range is discharged to uniformly charge all other sodium-sulfur batteries.

3. A method for controlling a plurality of sodium-sulfur batteries that, in an interconnected system in which a power generation device that fluctuates in output and an electric power storage-compensation device comprising a plurality of sodium-sulfur batteries connected in parallel are combined to supply power to an electric power system, are each included in the electric power storage-compensation device and compensate for output fluctuations of the power generation device, the method comprising compensating for the output fluctuations of the power generation device, while controlling so that all of the plurality of sodium-sulfur batteries are within a predetermined charged range by:

detecting when one or more of the plurality of sodium-sulfur batteries reaches one of a charge end or a discharge end within the predetermined charged range, wherein when one sodium-sulfur battery of the plurality of sodium-sulfur batteries reaches the discharge end of the predetermined charged range, a sodium-sulfur battery closest to the charge end of the predetermined charged range among other sodium-sulfur batteries is discharged to charge the sodium-sulfur battery reaching the discharge end of the predetermined charged range; and simultaneously discharging, voltage from all of the sodium-sulfur batteries other than the sodium-sulfur battery reaching the discharge end to maintain the power output for the interconnected system at a predetermined target value; and when one sodium-sulfur battery of the plurality of sodium-sulfur batteries reaches the charge end of the predetermined charged range, the sodium-sulfur battery reaching the charge end of the predetermined charged range is discharged to charge a sodium-sulfur battery closest to the discharge end of the predetermined charged range among other sodium-sulfur batteries.

4. The method for controlling a plurality of sodium-sulfur batteries according to claim 1, wherein the output fluctuations of the power generation device are compensated while controlling so that the plurality of sodium-sulfur batteries so that each of the plurality of sodium-sulfur batteries has a remaining capacity ratio of 20% to 80%.

5. The method for controlling a plurality of sodium-sulfur batteries according to claim 1, wherein the power generation device that fluctuates in output is a natural energy power generation device that uses natural energy of at least one of wind, solar power, and geothermal heat.

6. The method for controlling a plurality of sodium-sulfur batteries according to claim 2, wherein the output fluctuations of the power generation device are compensated while controlling the plurality of sodium-sulfur batteries so that each of the plurality of sodium-sulfur batteries has a remaining capacity ratio of 20% to 80%.

7. The method for controlling a plurality of sodium-sulfur batteries according to claim 3, wherein the output fluctuations of the power generation device are compensated while controlling the plurality of sodium-sulfur batteries so that each of the plurality of sodium-sulfur batteries has a remaining capacity ratio of 20% to 80%.

8. The method for controlling a plurality of sodium-sulfur batteries according to claim 2, wherein the power generation device that fluctuates in output is a natural energy power generation device that uses natural energy of at least one of wind, solar power, and geothermal heat.

9. The method for controlling a plurality of sodium-sulfur batteries according to claim 3, wherein the power generation device that fluctuates in output is a natural energy power generation device that uses natural energy of at least one of wind, solar power, and geothermal heat.

10. The method for controlling a plurality of sodium-sulfur batteries according to claim 4, wherein the power generation device that fluctuates in output is a natural energy power generation device that uses natural energy of at least one of wind, solar power, and geothermal heat.

11. The method for controlling a plurality of sodium-sulfur batteries according to claim 6, wherein the power generation device that fluctuates in output is a natural energy power generation device that uses natural energy of at least one of wind, solar power, and geothermal heat.

12. The method for controlling a plurality of sodium-sulfur batteries according to claim 7, wherein the power generation device that fluctuates in output is a natural energy power generation device that uses natural energy of at least one of wind, solar power, and geothermal heat.

13. A method for controlling a plurality of sodium-sulfur batteries in an electric storage compensation device that is interconnected with a power generation device having an output that fluctuates, where an output from the power generation device and the electric storage compensation device are combined to supply a predetermined power to an electric power system, the method comprising:

measuring an output power of the power generation device having an output that fluctuates;

compensating for output power fluctuations of the power generation device with power from at least one sodium-sulfur battery of the plurality of sodium-sulfur batteries in the electric storage compensation device to supply the predetermined power to the electric power system when the output power of the power generation device is less than the predetermined power supplied to the electric power system;

charging one or more of the plurality of sodium-sulfur batteries with power from the power generation device when the output power of the power generation device is greater than the predetermined power supplied to the electric power system;

monitoring a charge state of each of the plurality of sodium-sulfur batteries in the electric storage compensation device, and controlling a charge state of each of the plurality of sodium-sulfur batteries so that all of the plurality of sodium-sulfur batteries are within a predetermined charged range by detecting when one or more of the plurality of sodium-sulfur batteries reaches one of a charge end or a discharge end within the predetermined charge range, charging one sodium-sulfur battery reaching a discharge end of the predetermined charged range from all sodium-sulfur batteries of the plurality of sodium-sulfur batteries other than the one sodium sulfur battery reaching the discharge end when the one sodium-sulfur battery reaches the discharge end of the predetermined charged range, and simultaneously discharging voltage from all of the sodium-sulfur batteries other than the sodium-sulfur battery reaching the discharge end to maintain the power output for the interconnected system at a p determined target value; and discharging power from one sodium-sulfur battery reaching a charge end of the predetermined charged range to one or more sodium-sulfur batteries of the plurality of sodium-sulfur batteries when the one sodium-sulfur battery reaches the charge end of the predetermined charged range, wherein values for the discharge end and the charge end are set by setting control target values of a bidirectional converter, wherein the charge end of one of the sodium-sulfur batteries is detected by measuring a voltage increase, and wherein the discharge end of one of the sodium-sulfur batteries is detected by measuring a voltage decrease.

\* \* \* \* \*